United States Patent [19]
deCarmo et al.

[11] Patent Number: 6,133,920
[45] Date of Patent: Oct. 17, 2000

[54] METHOD AND APPARATUS FOR ACTIVATING BUTTONS FROM A DVD BITSTREAM USING A POINTING DEVICE

[75] Inventors: Linden A. deCarmo; Jan L. Christensen, both of Plantation; Amir M. Mobini, Delray Beach, all of Fla.

[73] Assignee: Oak Technology, Inc., Sunnyvale, Calif.

[21] Appl. No.: 09/122,954

[22] Filed: Jul. 27, 1998

[51] Int. Cl.[7] ........................................................ G06F 3/00
[52] U.S. Cl. .............................................................. 345/354
[58] Field of Search .................................... 345/326, 335, 345/339, 348, 352, 354, 356, 357, 353; 369/24, 27, 41, 98

[56] References Cited

U.S. PATENT DOCUMENTS

| | | | |
|---|---|---|---|
| 5,548,703 | 8/1996 | Berry et al. | 345/357 |
| 5,818,439 | 10/1998 | Nagasaka et al. | 345/327 |
| 5,929,857 | 7/1999 | Dinallo et al. | 345/354 |
| 5,991,244 | 11/1999 | Kondo et al. | 369/33 |

*Primary Examiner*—Crescelle N. dela Torre
*Attorney, Agent, or Firm*—Kudirka & Jobse, LLP

[57] ABSTRACT

A DVD playback system in accordance with the principles of the present invention provides a method and apparatus in which a pointing device, such as a mouse, a joystick, or a stylus may activate "non-user" buttons while conforming to the DVD specification. The DVD playback system responds to the tentative selection of a non-user button, i.e., a target button by determining whether the target button would be a connectable destination, if any directional button were activated while the current button is selected. If the target button is accessible to the currently selected button via directional commands, the playback system determines whether there is a connectivity path between the currently selected button and the target button through one or more intermediate buttons. If such a path exists, the playback system selects each intermediate button until the target button is reached, at which point the target button is selected. If no such path exists, the system returns an error which may be used to generate an error feedback that indicates to a user that the button is not selectable by the pointing device.

19 Claims, 6 Drawing Sheets

METHOD AND APPARATUS FOR ACTIVATING BUTTONS FROM A DVD BITSTREAM USING A POINTING DEVICE

FIELD OF THE INVENTION

This invention relates generally to improvements in digital versatile disc systems and, more particularly, to a technique for enabling a pointing device to activate buttons.

BACKGROUND OF THE INVENTION

Digital versatile discs (DVDs) are information storage devices used for storing prerecorded audio information, movies and computer software. The storage mechanism used in DVDs closely resembles that used in compact discs (CDs). DVD players also use the same laser technology as CD players. Briefly, both DVDs and CDs store information as a pattern of pits formed in a metallic substrate. The pit patterns form digital words and can be read by shining a laser beam on the disc surface and detecting the reflected beam. The information storage capacity of a typical DVD, however, is much higher than a CD. Presently available DVDs have a variety of capacities which depend on the technology used to manufacture the discs. Single-layer technologies can be either single or double-sided with capacities of 4.7 gigabytes and 9.4 gigabytes, respectively. Dual layer technologies which use single or double sided capacities that hold approximately 8.5 gigabytes per side are available. This high information storage capacity makes DVDs suitable for storing not only audio information, but also video information and large amounts of computer data as well.

DVD players have many CD player features, such as the ability to play selections in any order desired and the ability to read information from any point on the disc. However, DVDs can store information in several formats. For example, DVDs which are used to store video information, hereinafter called DVD-VIDEO discs, may use various known information compression algorithms, such as MPEG-2 for video compression/decompression. A DVD may also include high fidelity sound data in the form of linear pulse code modulated data streams that have sampled at various rates. Still other DVD versions, hereinafter called DVD-ROM discs, can store digital data for computer use, and the data may also be compressed on these discs.

Although DVD-ROM and DVD-VIDEO discs share compression algorithms, the data format on DVD-VIDEO discs is significantly different than the data format found on DVD-ROM discs. One important difference is that the data content on DVD-ROM is platform-specific, while DVD-VIDEO discs operate with a platform independent navigation engine for playing interactive movies. This navigation engine requires that the files on the DVD-VIDEO disc be referenced in a predetermined directory structure.

The specific navigational commands that are recognized by a DVD player are controlled by a device independent language and a set of DVD player parameters that define the current state of the DVD player. The DVD command set, including the aforementioned commands and their definitions, are published in the DVD specification. A copy of the DVD 1.0 Specification for Read-Only Disc Vol. 3, including a more detailed description of all DVD commands, may be obtained, for example, from Toshiba Corp., 1-1 Shibaura 1-Chome, Minato-ku, Tokyo 105-01 Japan.

In particular, each DVD-VIDEO disc contains a main directory denoted as a VIDEO_TS directory that contains two types of files distinguished with the file extensions .IFO and .VOB. During playback, these files are sorted by a DVD video player to form video "title" sets, that are groupings of all files necessary to play a particular DVD video "title", for example, a movie. Each video title set is composed of one IFO file and one or more .VOB files.

A file with the .VOB extension contains the actual multimedia data and is called a video object set. The location and format of the multimedia data stored in the video object set is defined by the associated .IFO file. In particular, .IFO files contain navigational data structures and a processor-independent interpreted language which specifies how the data structures are arranged.

The data structures themselves are composed of various objects called "program chain objects", "program objects", and "cell objects". Program chain objects link related program objects (or particular scenes) within a title and their data structures govern the playback of the program objects. For example, a simple title may contain only one program chain. However, complex titles may contain two or more program chains to allow random access to a variety of programs. The multiple program chain title can play programs linearly, randomly or in a "shuffle" mode. Program chains allow a particular program sequence to be changed during playback. Thus, it is possible to change the program contact based on stored information. This type of operation is used in implementing "parental control" levels in which information content which parents might find inappropriate (such as extremely violent or sexual material) can be removed from a playback and other material substituted without requiring several separate and complete programs.

Each program object in a program chain is composed of elements called "cell objects". These objects instruct a DVD player which portion of the multimedia data in one of the .VOB files to decode. In particular, the data structures in a cell object are defined in the .IFO file and the multimedia content is found in one of the .VOB files. Each cell object directs the DVD player to begin playback at a specific location in the .VOB file which is referred to as a video object unit or "VOBU". A VOBU is a container object that includes both multimedia data and playback program commands. More specifically, each VOBU may contain a header or navigation pack called an "NV_PACK" that, in turn, contains navigational commands, user operation data and "highlight" commands which control the presentation of the information on the display.

The specific program commands which are recognized by a DVD player are controlled by a device independent language and a set of DVD player parameters which define the current state of the DVD player. These commands cause the DVD player to perform a number of operations, such as generating menu controls at specific locations on the display screen. In order to process these commands a DVD player system typically includes a processor and associated memory (which may be part of the player or a separate computer) and display device. The player system may be controlled by a playback program running on an operating system such as the WINDOWS NT®, commercially available from MicroSoft Corp., Redmond, Wash., or the OS/2® operating system, commercially available from IBM Corp., Armonk, N.Y.

Navigational input can also be obtained directly from a user by means of navigational buttons which are displayed on-screen, along with the multimedia data, under playback program control. The playback program controls both the time duration that the button appears on the screen and the manner in which the system responds to the selection of a button by a user. For example, user selection of a button may cause the playback program to jump to a new location on the disc and begin playback at the new location.

The DVD specification for Read-Only Disc Vol 3, enables content to accept user input via on-screen buttons. These buttons are typically rectangular areas, although other shapes are possible, such as square, triangle, round, oval, etc., that allow a user to activate a modification or action by clicking the pointing device while overlaying the button. When a user accesses the navigational commands with a pointing device, such as a mouse, the user manipulates the pointing icon to the desired command or button. Once the user has located the desired command, the user clicks on the button with the pointing device to select or activate the command. The user navigators currently available use linear processing to determine the coordinates of each button. The pointing icon typically falls within a range of coordinates to signify that a given button has been selected.

Buttons are typically displayed within a subpicture area of the video display. That is, a video processor typically combines subpicture information with video information to produce a video output having an "overlay" of subpicture information. Some buttons, referred to as "user buttons", are accessible via a remote control device's numeric keypad entry, other buttons, referred to as "non-user buttons" are accessible via the device's directional arrows, i.e., up, down, left and right.

Pointing devices, such as a mouse, a joystick or a stylus, do not generate directional command data. That is, pointing devices require a user to place a cursor "over" a displayed button, then "click" on the button in order to activate, or select, it. As a result, there is no provision within the DVD specification for such pointing devices to access non-user buttons, i.e., the buttons that are normally accessed by the directional arrows on a remote control device.

Accordingly, a need exists for a technique by which DVD players designed according to legacy specifications can access displayed buttons via a mouse, a stylus or other pointing device while still complying with the specifications to which they were designed.

SUMMARY OF THE INVENTION

The present invention provides a method apparatus and computer program product whereby pointing input devices may activate "non-user" buttons while conforming to the DVD specification. In an illustrative embodiment a DVD playback system responds to the tentative selection of a non-user button by a pointing input device by determining whether the target button is connected to the currently selected button. That is, given that a user button is selected referred to as the currently selected button, the playback system determines whether the target button would be the destination button if a directional arrow input was received while the current button were selected. If the target button is "connected" in this sense, the target button is selected, or activated.

If the target button is not "connected" in this sense, the playback system determines whether there is a connectivity path between the target button and the currently selected button. If there is such a path, the playback system selects the intervening buttons in sequence until the target button is selected. In this manner the playback system complies with the DVD specification while permitting the use of a pointing device in the selection of non-user buttons. In the illustrative embodiment of the playback system, intervening buttons are not selected while creating this path between the currently selected and target buttons.

If there is no connectivity path between the currently selected and target buttons, the playback system generates an error signal which may be used to create visual, aural or other feedback that indicates to the user that the button may not be selected using a pointing device. According to one aspect of the invention a method, apparatus and computer program product for use with a DVD playback system having a user interface responsive to directional command data and button selection command data from a pointing device, the user interface capable of displaying a plurality of buttons arranged in predetermined relations, selected of the buttons directly selectable by a user with button selection command data, other of the buttons not directly selectable by a user with button selection command data but accessible with directional command data initiated from the pointing device, perform the steps of receiving button selection command data from the pointing device, the button selection command data identifying a target button; determining whether the target button is a user selectable button; and determining whether a connectivity path from a currently selected button to the target button exists, if the target button is not a user selectable button.

According to one implementation the invention contemplates determining whether an intermediate button is directly connected to the target button or the currently selected button, the intermediate button serving as a test button at the end of the connectivity path; determining whether another intermediate button is directly connected to the test button; and repeating the prior step until the test button is directly connected to the currently selected button or the target button or until the connectivity path is terminated.

BRIEF DESCRIPTION OF THE DRAWINGS

The above and other features, objects and advantages of the invention will be better understood by referring to the following detailed description in conjunction with the accompanying drawing in which.

DETAILED DESCRIPTION

Figure 1:
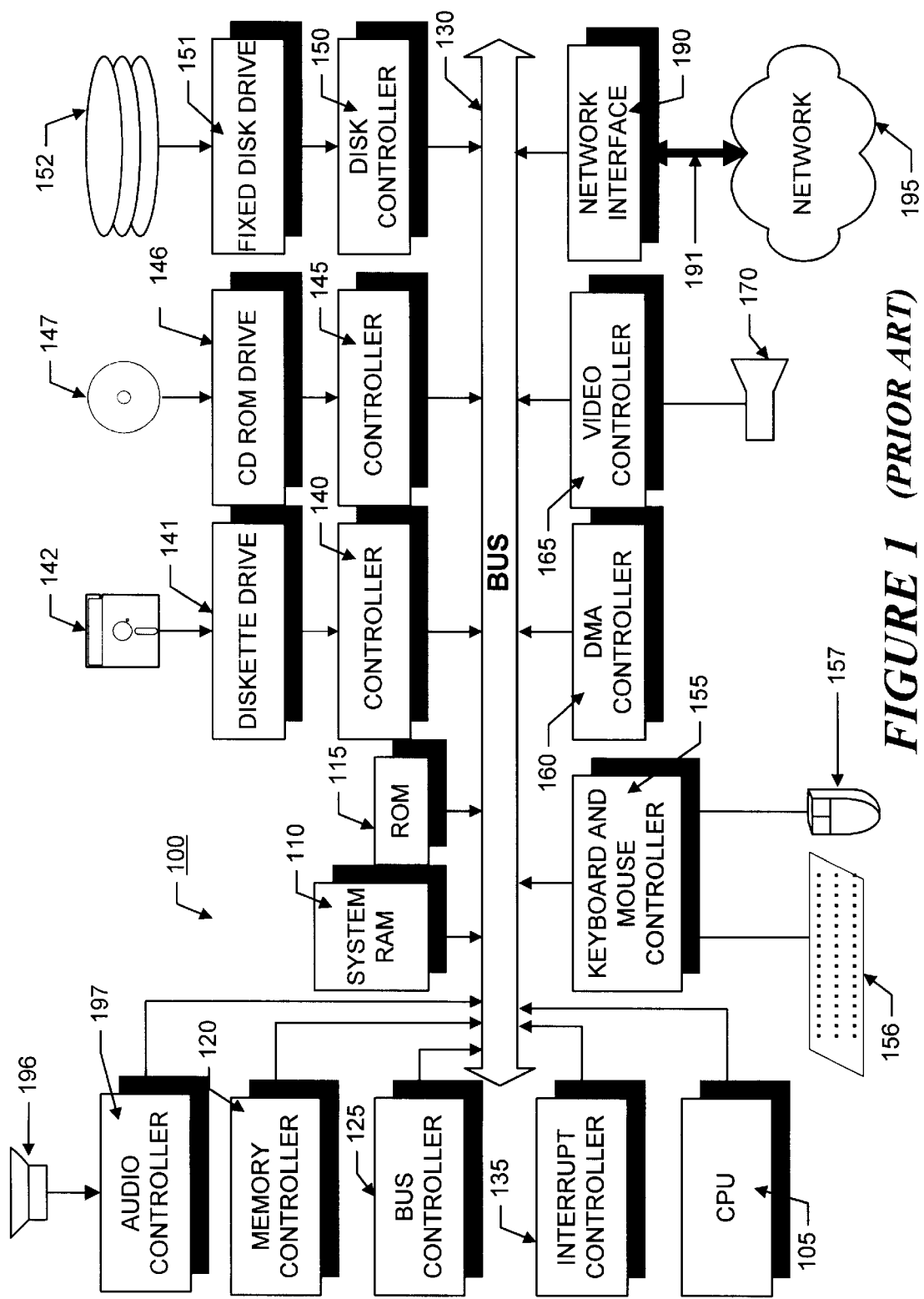
FIG. 1 is a block diagram of a computer system suitable for use with the present invention.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as in IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146 which is, in turn, connected to bus 130 by controller 145. Hard disc 152 is part of a fixed disc drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, available from International Business Machines Corporation, Boca Raton, Fla. The operating system controls allocation of system resources and performs tasks such as processing scheduling, memory management, networking, and I/O services, among things. In particular, an operating system resident in system memory and running on CPU 105 coordinates the operation of the other elements of computer system 100. The present invention may be implemented with any number of commercially available operating systems including OS/2, UNIX and DOS, etc. One or more applications, such as Lotus NOTES™, commercially available from Lotus Development Corp., Cambridge, Mass. may also run on the CPU 105. If the operating system is a true multitasking operating system, such as OS/2, multiple applications may execute simultaneously.

Figure 2:
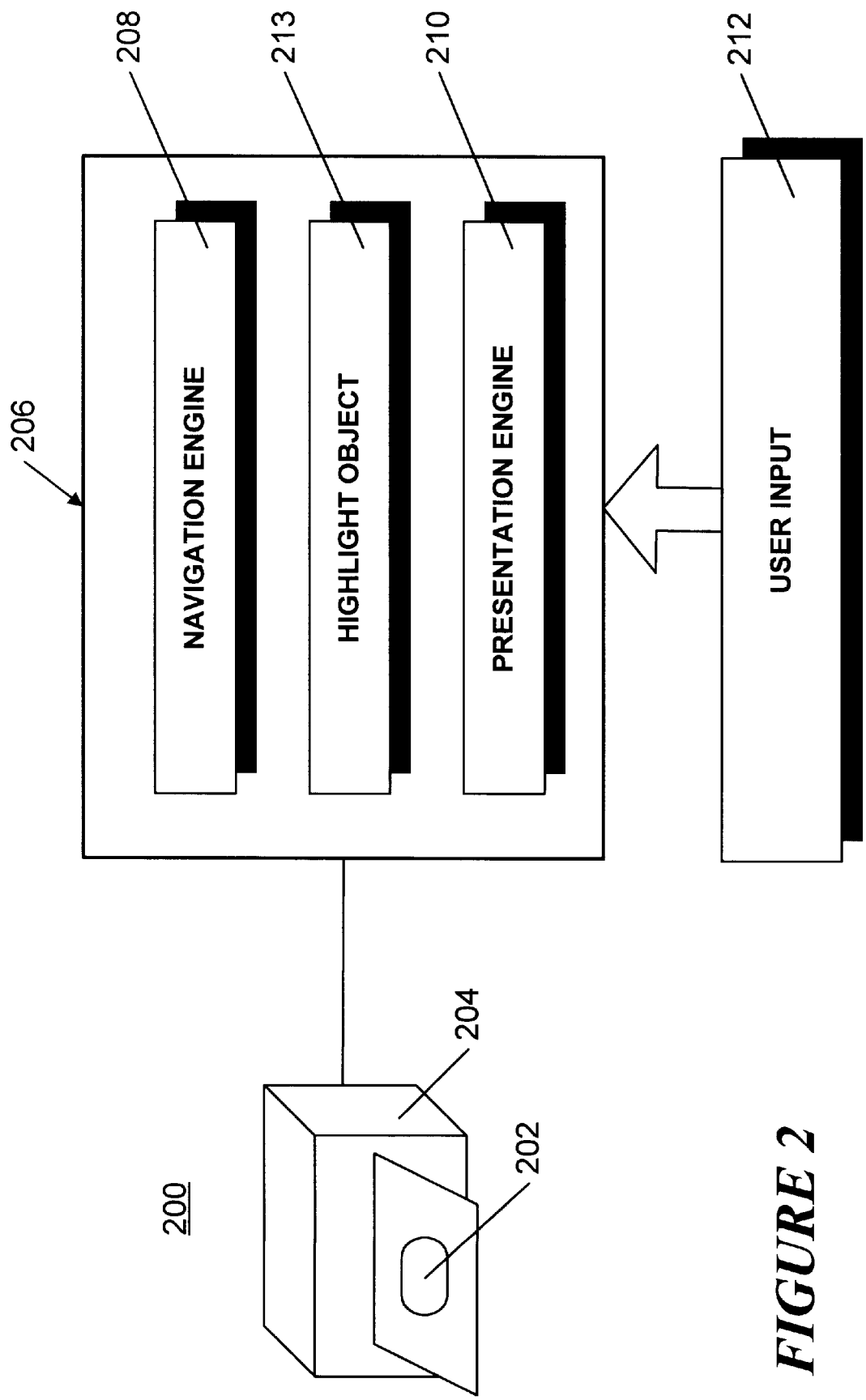
FIG. 2 is a conceptual diagram of the elements comprising an Interactive DVD Browser suitable for use with the present invention.

FIG. 2 illustrates conceptually the main components of a system 200 in accordance with the present invention. FIG. 2 shows a DVD-ROM drive 204 connected to a computer 206. Use of the DVD-ROM drive 204 with the computer 206 should not be construed as a limitation of the invention, however, since other DVD source mechanisms such as the internet, digital satellite dishes, etc., may be substituted for the DVD-ROM drive 204. In addition, the DVD-ROM drive 204 may also be a drive suitable for internal mounting in computer 206.

The DVD drive 204 receives a disc 202 containing compressed and encoded information which has been coded in accordance with the DVD 1.0 Specification for Read-Only Disc and disc 202 may contain up to seventeen gigabytes of information. The computer 206 includes a driver, not shown, for enabling the operating system in the computer 206 to control and exchange information with the drive 204. Computer 206 also includes one or more input devices 212 which receive input from a user.

The computer 206 also includes a control and playback program shown schematically in FIG. 2 as having a navigation object 208 with logic for reading data from the drive. A presentation engine 210 includes decompressing and decoding routines for decoding the information on the disc 202 and routines for formatting the information for display. For example, the audio information may be compressed by means of conventional compression technique known as Dolby® AC-3® compression, also known as "Dolby® Digital" compression. Video information may be compressed using a compression technique known as Moving Picture Experts Group-2 (MPEG-2).

In an illustrative embodiment, the software elements of system 200 may be implemented using object-oriented programming techniques. As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Figure 3:
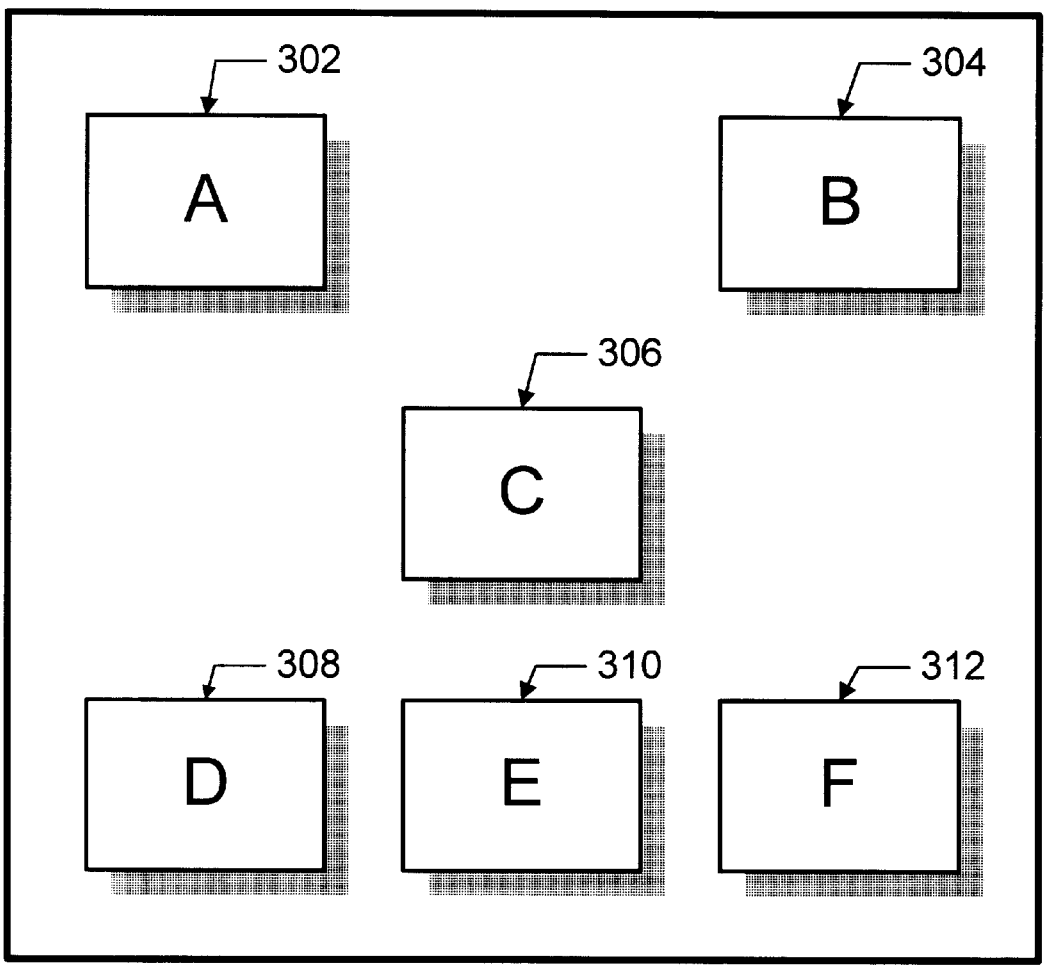
FIG. 3 is a conceptual diagram of a display which illustrates both user and non-user buttons that may be selected in accordance with the principles of the present invention.

In FIG. 3, a conceptual diagram of a display 300 including user and non-user buttons is depicted. Display 300 presents user buttons A, B and C, 302, 304, and 306, respectively., and non-user buttons include buttons D, E, and F, designated 308, 310, and 312, respectively. In the illustrative embodiment, each button may be implemented with one or more objects. The button information being maintained in such objects as data attributes. Such information may comprise the button name, functions, user selectivity status, directional and selection command data to which the button responds, and connectivity and relational information for adjacent buttons. Navigation information associated with each button includes information regarding adjacent buttons. For example, navigation information associated with the "A" button 302 indicates that, in response to the activation of a "down arrow" while the A button 302 is selected, the D button 308 is selected. Similarly, in response to the activation of a "right arrow" while the A button 302 is selected the B button 304 is selected. In accordance with the principles of the present invention non-user buttons, such as the F button 312 may be selected through the use of a pointing input device, such as a mouse, even though the F button 312 is a non-user button, i.e., a button that, according to the DVD specification, is to be selected via directional input, not through the keypad type input provided by a pointing input device such as a mouse, joystick, stylus, etc.

In an illustrative embodiment, a non-user button may be selected by a pointing device if there is a connection path between the currently selected button and the button that is target by the pointing device. Illustratively, the new navigation engine determines whether a path exists between the two buttons, and, if a path exists, selects each of the intervening buttons within the path, then selects the target button. The effect of selecting the intervening buttons need not be displayed, so that, potential confusion on the part of a user may be avoided. If the navigation engine determines that there is no connection path between the buttons, the navigation engine returns an error. In response to the error the user interface may display a visual indication, provide an aural indication, or, in the case of an input device such as a joystick, a hatpin indication, that selection of the button is not permitted.

Figure 4:
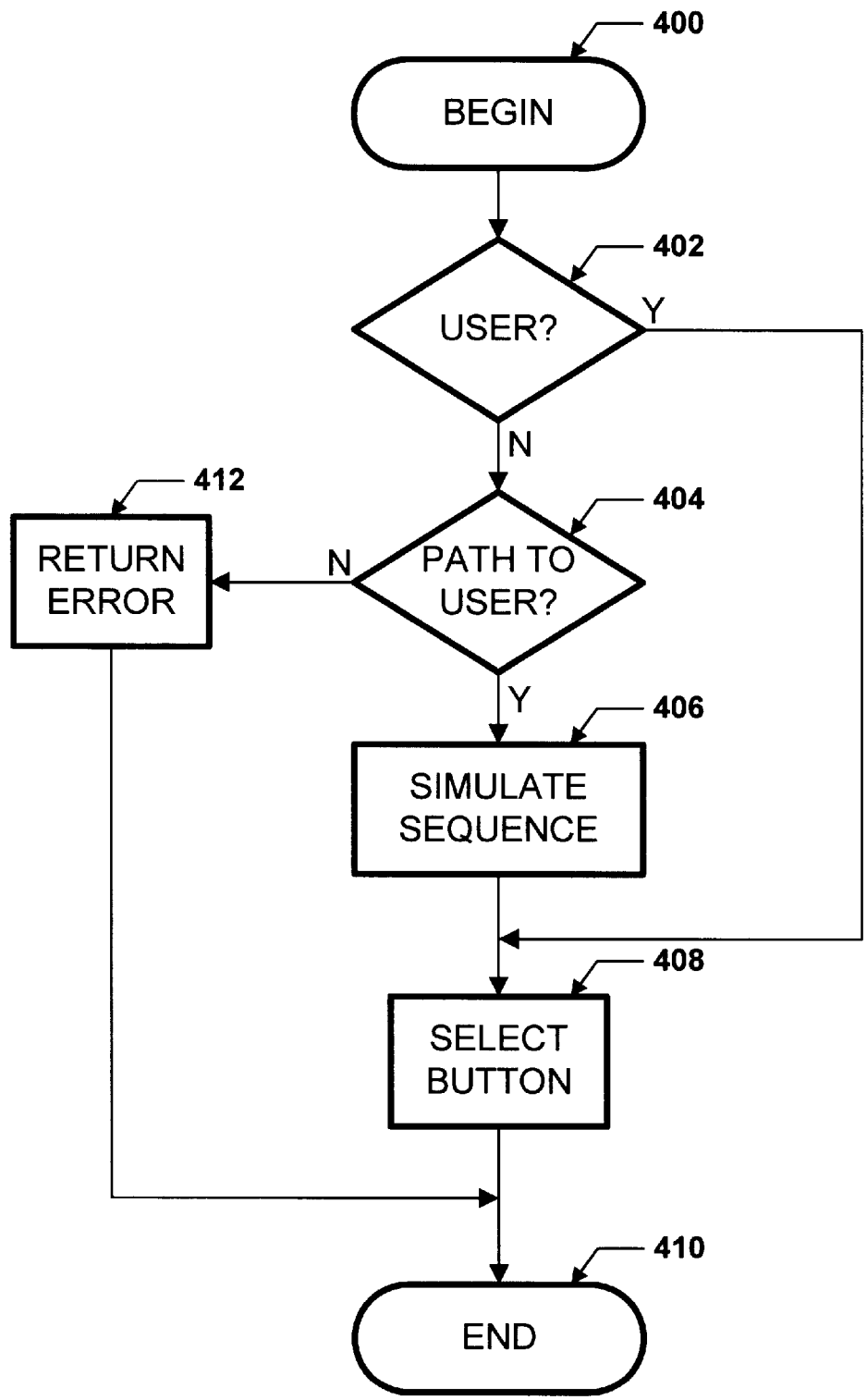
FIG. 4 is a flow chart of the method steps for selection of a non-user selectable button in accordance with the principles of the present invention.

The flow chart of FIG. 4 depicts the overall operation of the navigation engine in determining whether a target button may, in fact, be selected. The process begins in step 400 and proceeds from there to step 402 where the navigation engine determines whether the target button is a user button or a non-user button. If the target button is not a user button the process proceeds to step 404 where it is determined whether there is a path between the currently selected button and the target button. This process of path determination is set forth in greater detail with reference to the flow chart of FIG. 5. If a path between the currently selected button and the target button exists, the process proceeds from step 404 to step 406. In step 406, the sequence of intermediate button selections required to reach the target button from the currently selected button is simulated in order to comply with the DVD specification. After the sequence of intermediate button selections is simulated in step 406, the process proceeds to step 408 where the target button is selected. Visual feedback that indicates that the button is selected may be supplied to a user and the function associated with the button may be effected in a conventional manner. From step 408 the process proceeds to end in step 410.

Returning to step 402, if the navigation engine determines that the target button is a user button, the process proceeds to step 408, where the target button is selected. From step 408 the process proceeds as previously described.

If, in step 404, the navigation engine determines that there is no path between the currently selected button and the target button, the process proceeds to step 412, where an error signal is returned. The error signal may be employed, for example, to produce a visual indication to the user that the target button the user attempted to select is not selectable, or to generate feedback to alert the user of the error. After returning the error signal the process proceeds from step 412 to end in step 410.

Figure 5:
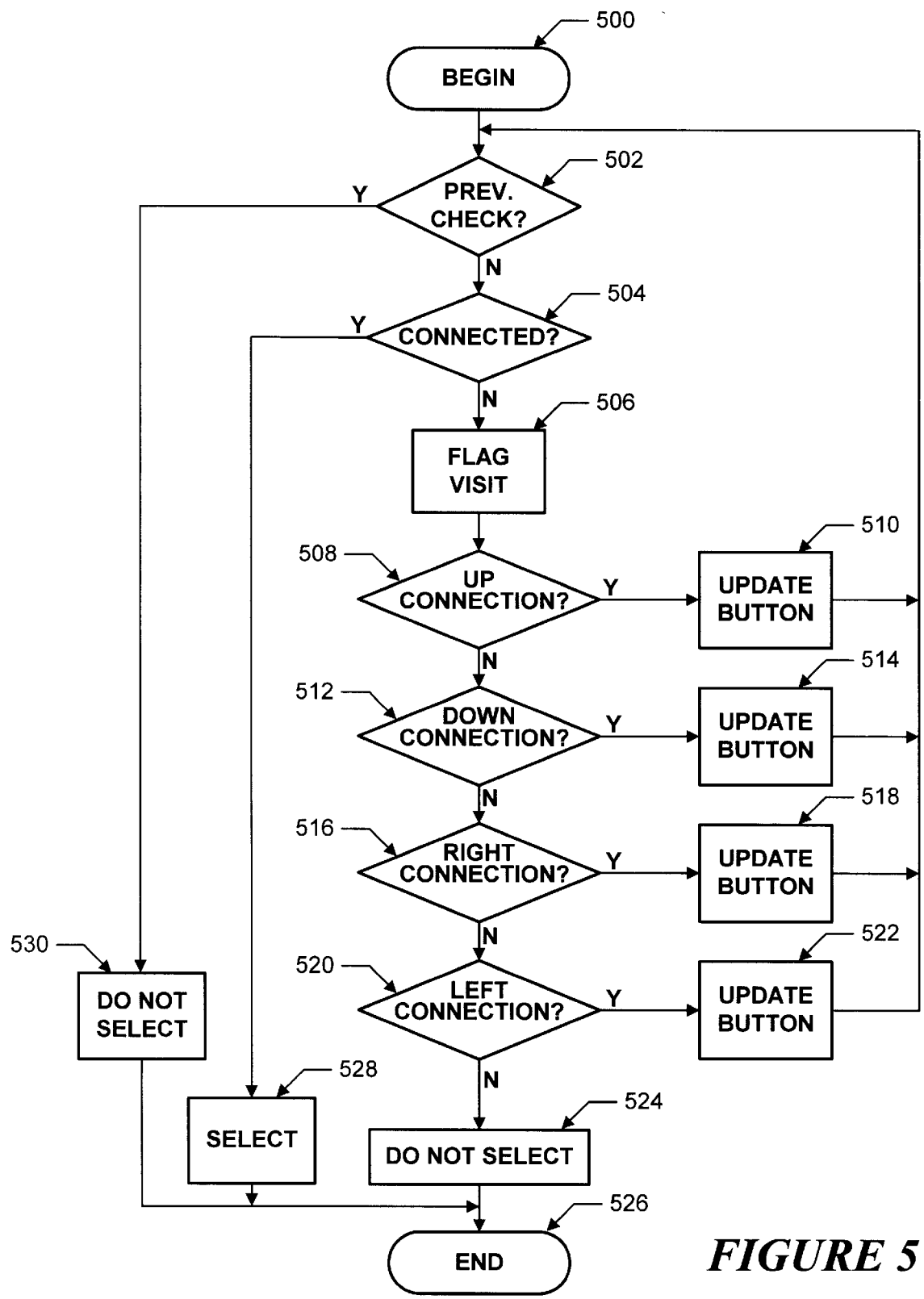
FIG. 5 is a flow chart of the method steps for determination of whether a target button is "connected" to a user button in accordance with the principles of the present invention.

The flow chart of FIG. 5 illustrates in greater detail the process steps for determining whether a path exists between a currently selected button and a target button. The process generally involves a recursive call to an object or objects within the navigation engine to determine whether there is a connection between the currently-tested button and another button. The path between buttons is extended from the target button, through intermediate buttons, on a button-by-directly-connected button basis, until a connectivity path from the currently-selected button to the target button is reached or a break in the chain of buttons is detected. For the purposes of this explanation, a first button is directly connected to a second button if selection of a directional command such as up, down, left, right, while the first button is currently selected, results in access to and/or selection of the second button. A connectivity path, for the purposes of this discussion, may comprise first and second buttons directly connected to each other or operatively coupled through one or more intermediate buttons each of which may be accessed using appropriate directional commands so as to enable a sequential selection process from the first button to the second button.

The path determination process begins in step 500 and proceeds from there to step 502. In step 503, the value of the currently selected button is retrieved from the navigation engine. In order to avoid looping through the test algorithm indefinitely, in step 502, a button to be tested is checked to determine whether it has been tested for connectivity before. If the button has not been checked previously, the process proceeds from step 502 to step 504. In step 504, the button being tested, e.g., the target button in the first pass and an intermediate button in subsequent passes, is checked to determine whether the subject button is connected through an adjacent directional path to the currently-selected button. The process of determining whether a button is "connected" is set forth in greater detail in the discussion related to the flow chart of FIG. 6. The process contemplates use of a temporary button object, similar to the button information objects described previously to. The process proceeds from step 504 to step 506, where an indicator, such as a flag, is activated to record the fact that the currently-tested button is being tested. This indicator may be employed, for example, in a subsequent pass through the process in step 502 to indicate that the button should not be selected.

From step 506 the process proceeds to step 508 where it is determined whether there is a connection between the button being tested and an adjacent button through the "up" directional path. If there is such a connection, the process proceeds to step 510 where the information related to the button being tested is updated in an object to reflect the information of the information of the temporary button object adjacent button in the "up direction". From step 510 the process returns to step 502 where the new subject button, i.e. the button which was adjacent in the "up" direction during the previous pass, is tested, as previously described. If it is determined in step 508 that there is not a connection in the up direction, the process proceeds to step 512 where it is determined whether there is a connection in the down direction. Similar to step 508, if there is a connection in the down direction, the process proceeds to step 514 where the temporary button object is updated to reflect the adjacent button in the down direction. From step 514 the process proceeds to step 502, and, from there, as previously described. If, in step 512 it is determined that a connection does not exist in the down direction, the process proceeds to step 516 where it is determined whether a connection exists in the right direction. If there is a connection in the right direction the process proceeds to step 518 where the temporary button object is updated to reflect the adjacent button in the right direction. From step 518 the process proceeds to step 502, and, from there, as previously described. If it is determined in step 516 that it is determined that a connection does not exist in the right direction, the process proceeds to step 520 where it is determined whether there is a left connection. If there is a left connection, the process proceeds to step 522 where the temporary button object is updated to reflect the adjacent button in the t direction. From step 522 the process proceeds to step 502 and from there, as previously described.

If it is determined in step 520 that there is no connection in the left direction, there is no connection in any direction to the target button, and, consequently, the path being sought between the target button and the currently selected button terminates. Consequently, the process proceeds to step 524 where the determination is made not to select the target button and an error signal is returned. The error signal may be employed, as previously described, to alert a user that the target button may not be selected by the pointing device. From step 524 the process proceeds to end in step 526. If, in step 502, it is determined that the button has been checked previously, the process proceeds to step 530, where the decision is made not to select the target button. From step 530 the process proceeds to end in step 526. If it is determined in step 504 that the target button is operatively connected to the currently selected button through one or more intermediate buttons, the process proceeds to step 528 where the target button is selected. From step 528 the process proceeds to end in step 526.

Figure 6:
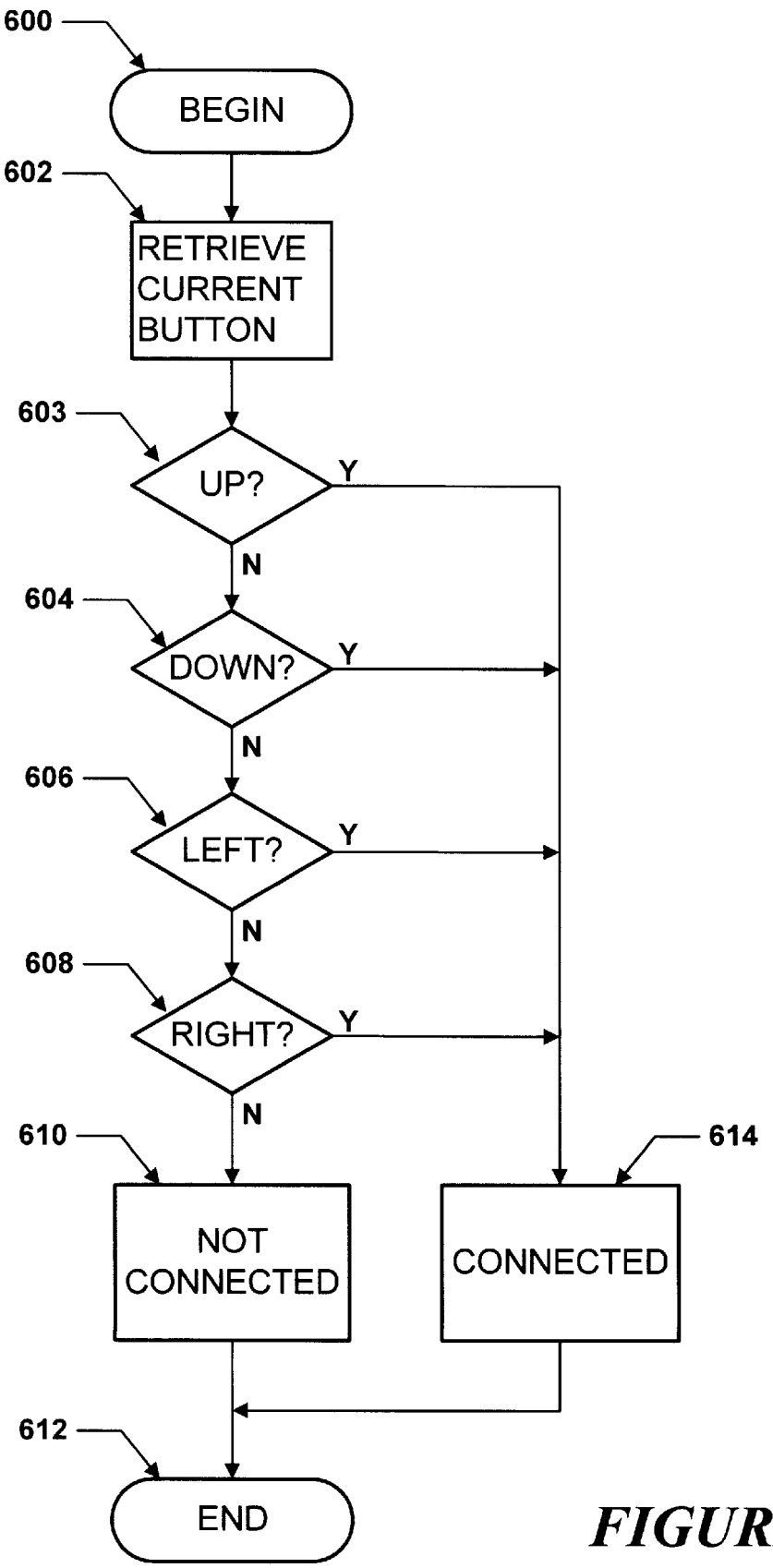
FIG. 6 is a flow chart that illustrates the method steps for determination of whether a path exists between a target button and a currently selected user button in accordance with the principles of the present invention.

The process of determining whether a button is connected is set forth in greater detail in the flow chart of FIG. 6. The process begins in step 600 and proceeds to step 602 where connectivity information for the currently selected button is retrieved from the relevant button information object. Such connectivity information may include information on a button which is to be selected in response to assertion of any directional command data such as the up, down, left, or right arrow. From step 602 the process proceeds to step 603 where the button in question, which may be the target button or another button that lies between the target button and the currently-selected button, is tested to determine whether the currently-selected button is connected to the subject button through an up connection. If the button in question is not connected through a up connection from the currently-selected button, the process proceeds to step 604 where it is determined whether the button in question is connected to the currently-selected button through a down connection from the currently selected button. If the button in question is not connected through a down connection from the currently-selected button, the process proceeds to step 606 where it is determined whether the button in question is connected to the currently-selected button through a left connection from the currently selected button. If no such connection exists, the process proceeds from step 606 to step 608. In step 608 it is determined whether the button in question is connected to the currently-selected button through a right connection from the currently selected button. If no such connection exists, the process proceeds to step 610 where the button is marked as "not connected". From step 610 the process proceeds to end in step 612. If, in any of the steps 603 through 608, it is determined that the button in question is connected to the currently-selected button, the process proceeds to step 614 where the button in question is marked as connected. From step 614 the process proceeds to end in step 612.

The above-described invention may be implemented in either all software, all hardware, or a combination of hardware and software, including program code-based implementations stored in firmware format to support dedicated hardware. A software application suitable for implementing the invention in is the Interactive DVD Browser (IDB), Version 1.0 and thereafter, commercially available from Oak Technology, Inc., Sunnyvale, Calif.

A software implementation of the above described embodiment(s) may comprise a series of computer instructions either fixed on a tangible medium, such as a computer readable media, e.g. diskette 142, CD-ROM 147, ROM 115, or fixed disc 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate object or processor instructions, or in hybrid implementations which utilize a combination of hardware logic, software logic and/or firmware to achieve the same results, the specific configuration of logic and/or instructions utilized to achieve a particular function, as well as other modifications to the inventive concept are intended to be covered by the appended claims.

What is claimed is:

1. In a DVD playback system having a user interface responsive to directional command data and button selection command data from a pointing device, the user interface capable of displaying a plurality of buttons arranged in predetermined relations, selected of the buttons directly selectable by a user with button selection command data, other of the buttons not directly selectable by a user with button selection command data but accessible with directional command data initiated from the pointing device, a method for selecting buttons not directly selectable by a user;

(a) receiving button selection command data from the pointing device, the button selection command data identifying a target button at a first position on the user interface;

(b) determining whether the target button is a user selectable button; and (c) determining whether a connectivity path exists from a currently selected button at a second position on the user interface to the target button at the first position on the user interface, if the target button is not a user selectable button.

2. The method of claim 1 further comprising:

(d) selecting the target button if a connectivity path exists between the currently selected button and the target button.

3. The method of claim 1 further comprising:

(e) returning an error if a connectivity path does not exist between the currently selected button and target button.

4. The method of claim 1 wherein step (c) comprises the step of:
- (c.1) determining whether the target button is directly connected to the currently selected button.

5. The method of claim 4 further comprising:
- (c.2) selecting the target button if the target button is directly connected to the currently selected button.

6. The method of claim 1 where step (c) comprises:
- (c.1) determining whether an intermediate button, selectable with directional command data, is directly connected to one of the target button and the currently selected button, the intermediate button serving as a test button at the current end of the connectivity path;
- (c.2) determining whether another intermediate button is directly connected to the test button; and
- (c.3) repeating step (c.2) until the test button is directly connected to one of the currently selected button and the target button or the connectivity path is terminated.

7. The method of claim 6 further comprising:
- (c.4) selecting each button in the connectivity path in sequence between the currently selected button and the target button.

8. The method of claim 3 further comprising the step of:
- (f) providing feedback to a user whenever a non-user button is selected and no connectivity path to a currently selected button exists.

9. A computer program product for use with a DVD playback system having a user interface responsive to directional command data and button selection commands from a pointing device, the user interface capable of displaying a plurality of buttons arranged in predetermined relations, selected of the buttons directly selectable by a user with button selection command data, other of the buttons not directly selectable by a user with button selection command data but accessible with directional command data initiated from the pointing device, the computer program product comprising a computer usable medium having computer readable program code embodied thereon for selecting buttons not directly selectable by a user, the program code comprising:
- (a) program code for receiving button selection command data from the pointing device, the button selection command data identifying a target button at a first position on the user interface;
- (b) program code for determining whether the target button is a user selectable button; and
- (c) program code for determining whether a connectivity path exists from a currently selected button at a second position on the user interface to the target button, if the target button is not a user selectable button.

10. The computer program product of claim 9 further comprising:
- (d) program code for selecting the target button if a connectivity path exists between the currently selected button and the target button.

11. The computer program product of claim 9 further comprising:
- (e) program code for returning an error if a connectivity path does not exist between the currently selected and target button.

12. The computer program product of claim 9 wherein the program code for determining whether a connectivity path exists comprises:
- (c.1) program code for determining whether the target button is directly connected to the currently selected button.

13. The computer program product of claim 12 wherein the program code for determining whether a connectivity path exists comprises:
- (c.2) program code for selecting the target button if the target button is directly connected to the currently selected button.

14. The computer program product of claim 9 wherein the program code for determining whether a connectivity path exists comprises;
- (c.1) program code for determining whether there is an intermediate button directly connected to one of the target button and the currently selected button, if the target button is not directly connected to the currently selected button;
- (c.2) if there is a button directly connected to the target button, determining whether there is a button directly connected to the button that is connected to the target button; and
- (c.3) repeating step (j) until a path is found between the currently selected button and the target button or the path is terminated.

15. The computer program product of claim 14 further comprising:
- (c.4) program code for selecting each button in the thus-determined path in sequence from the currently selected button to the target button.

16. The computer program product of claim 9 further comprising:
- (f) program code for providing feedback to a user whenever a non-user button is selected and for which no connectivity path to a currently selected button exists is selected.

17. In a DVD playback system having a user interface responsive to directional command data and button selection command data from a pointing device, the user interface capable of displaying a plurality of buttons arranged in predetermined relations, selected of the buttons directly selectable by a user with button selection command data, other of the buttons not directly selectable by a user with button selection command data but accessible with directional command data initiated from the pointing device, the apparatus comprising:
- a navigation engine responsive to button selection command data from a pointing device, the button selection command data identifying a target button displayed at a first position on the user interface;
- program logic configured to determine whether the target button is a user selectable button; and
- program logic configured to determine whether a connectivity path exists from a currently selected button displayed at a second position on the user interface to the target button, if the target button is not a user selectable button.

18. The apparatus of claim 17 wherein the program logic configured to determine whether a connectivity path exists further comprises:
- program logic configured to determine whether at least one intermediate button operatively connects the currently selected button to the target button so as to form a continuous connectivity path with each button of the path being selectable in a predetermined order with button selection command data or directional command data.

19. The apparatus of claim 17 further comprising program logic configured to generate an error message if a connectivity path between the currently selected button and the target button does not exist.

* * * * *